May 30, 1933.   P. W. QUEEN   1,911,846

FLEXIBLE COUPLING

Filed May 12, 1931

Inventor
Patrick W. Queen
By his Attorneys
August Leary

Patented May 30, 1933

1,911,846

UNITED STATES PATENT OFFICE

PATRICK W. QUEEN, OF COPPERHILL, TENNESSEE, ASSIGNOR TO TENNESSEE COPPER COMPANY, A CORPORATION OF NEW JERSEY

FLEXIBLE COUPLING

Application filed May 12, 1931. Serial No. 536,785.

The present invention relates to flexible couplings and has for an object to provide a novel and improved coupling of this character, simple of construction, easy to assemble and economical of manufacture.

A further object of the invention is to provide a flexible coupling which will be strong and compact and which will afford a wide range of torsional elasticity between the coupled parts.

Other objects and advantages will appear from the following specification taken with the accompanying drawing illustratively disclosing an embodiment of the invention.

Figure 1:
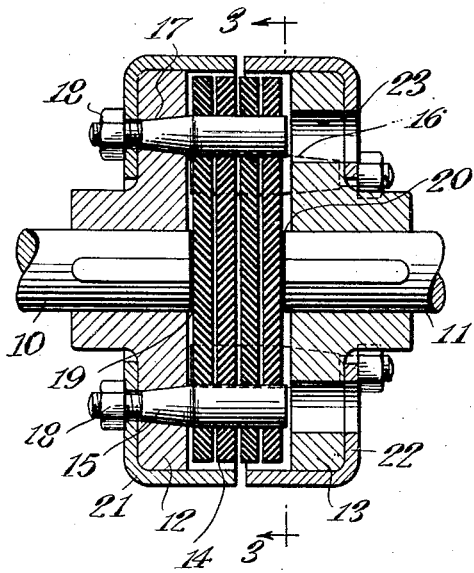
Figure 1 is a sectional view of an embodiment of the invention as applied between two coupled shafts and taken on the line 1—1 of Figure 2.

Referring to the drawing in detail, 10 and 11 designate shafts to which are secured coupling flanges 12 and 13 oppositely positioned and spaced apart sufficiently to accommodate a plurality of elastically yielding discs 14. The elastic discs are supported so as to make an effective driving connection between the opposing coupling flanges through the instrumentality of pins 15 and 16 projecting from and connected to the respective flanges 12 and 13.

Figure 2:
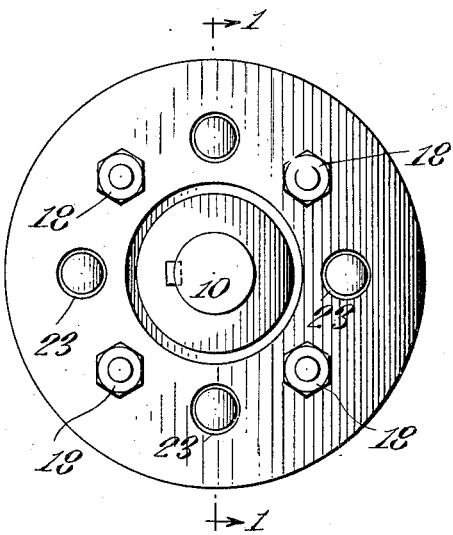
Figure 2 is an end view of the same.
Figure 3:
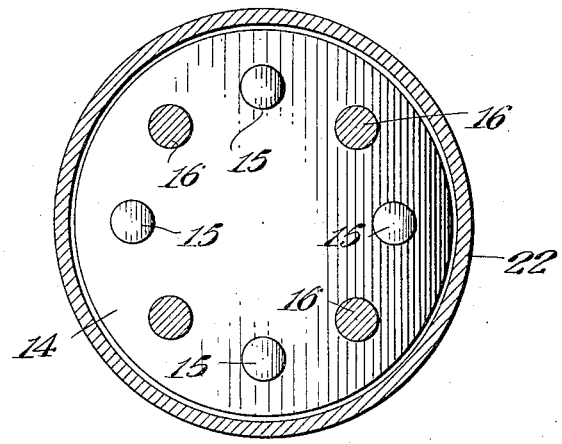
Figure 3 is a section on line 3—3 of Figure 1.

The pins on one of the flanges are staggered with relation to those on the other, so that the pins on one rigid flange lie between adjacent pins on the other and are preferably spaced equi-distantly therefrom. While the pins may be secured to their respective flanges in any suitable manner, they are advantageously as shown each tapered toward one end, which end is received in a similarly tapered aperture 17, the end of the pin projecting beyond the outer face of the flange and having a securing nut 18 threaded thereon. This method of securing the pins to the flanges has the advantage over prior constructions, where the flanges have been provided with threaded openings and the pins have been similarly threaded, that the pins may be more easily removed when it becomes necessary to replace the discs. The pins so secured to the flanges may be conveniently arranged in a circle as shown in Figures 2 and 3 of the drawing.

The opposite ends of the sets of pins related to each flange are free and are slightly spaced from the opposing flanges so as to permit of freedom of angular movement between the connected shafts within the elastic limits of the flexible discs. The pins are, further, devoid of any obstructions at their free ends which would tend to limit the movement of the flexible discs axially of the pins. This construction tends to facilitate the coupling and uncoupling of the two shafts in addition to permitting greater freedom of flexure between the coupled shafts.

In order to retain the flexible discs on the pins while permitting the freedom of movement desired, means is provided for restraining the discs from so moving laterally beyond the free ends of the pins. Such means may constitute projecting portions 19 and 20 of the respective shafts 10 and 11 as shown in the drawing, or may be separately formed or otherwise provided.

The flexible discs are made of any suitable material having the requisite elastic coefficient and at the same time being of sufficient strength to stand up under the force applied thereto through the shafting. Suitable material for this purpose is alternate layers of cotton fabric and rubber friction material such as is found in rubber belting.

When assembled in the coupling these flexible discs are restrained from expanding peripherally under the stresses of operation by shields or protection rings 21 and 22 secured to the rigid flanges. In the present showing the shields are shown as secured in place by the nuts 18 used in securing the pins 15 and 16 in place.

The rigid flanges are each provided with apertures 23 opposite the pins secured to the opposing flange which permit assembly with and disengagement of the pins from their respective flanges without removal of the shields. Also, by removal of the shields, the pins and flexible discs may be assembled with the flanges without removing the latter from the shafts or displacing the shafts from their operative position.

Owing to the compact arrangement of the discs, flange members and the protecting rings, whereby very little movement of the discs either laterally or radially is permitted, while at the same time permitting a very considerable movement of the shafts both angularly and torsionally, the present construction has decided advantages over prior constructions particularly where heavy service is required. The discs fill substantially all of the free space between the flanges and, consequently, do not tear out as quickly in service as would be the case if there were opportunity for displacement either laterally or radially.

It is to be understood that while I have illustrated the principles of my invention by a single embodiment that the same may be embodied in other constructions than that herein disclosed. I do not wish, therefore, to be limited in the scope of my invention except by the prior art and a liberal construction of the terms of the appended claims.

I claim:

1. In a flexible coupling, in combination, driving and driven shafts, a pair of coupling flanges one of which is secured to each of said shafts and having mutually opposed surfaces that are substantially co-extensive with one another and with the lateral faces of the flexible discs normally disposed between them, flexible discs held between and operatively connected to said flanges, pins detachably secured to each flange and having their free ends projecting through the flexible discs to within a short distance from but short of the opposing flange, said flanges being arranged to engage closely the interposed flexible discs and thereby prevent lateral expansion of said discs, and means associated with said flanges for preventing radial expansion of said discs, said means and said pins being removable without loosening the flanges or moving said shafts to permit removal and replacement of said flexible discs.

2. In a flexible coupling, in combination, driving and driven shafts, a pair of coupling flanges one of which is secured to each of said shafts and having mutually opposed surfaces that are substantially co-extensive with one another and with the lateral faces of the flexible discs normally disposed between them, flexible discs held between and operatively connected to said flanges, pins detachably secured to each flange and having their free ends projecting through the flexible discs to within a short dsitance from but short of the opposing flange, said flanges being arranged to engage closely the interposed flexible discs and thereby prevent lateral expansion of said discs, and ring members detachably secured to said flanges and so associated therewith and with said discs as to prevent radial expansion of said discs, said pins and said ring members being removable without loosening the coupling flanges or moving said shafts to permit replacement of said flexible discs.

3. In a flexible coupling, in combination, driving and driven shafts, a pair of coupling flanges one of which is secured to each of said shafts and having mutually opposed surfaces that are substantially co-extensive with one another and with the lateral faces of the flexible discs normally disposed between them, centrally imperforate flexible discs held between and operatively connected to said flanges, pins detachably secured to each flange and having their free ends projecting through the flexible discs to within a short distance from but short of the opposing flange, said flanges being arranged to engage closely the interposed flexible discs and thereby prevent lateral expansion of said discs, means extending inwardly from the opposed face of each of said flanges towards said centrally imperforate portions of said discs beyond the respective planes defined by the free ends of the pins on the two flanges for restraining said flexible discs from moving laterally beyond the free ends of said pins, and means associated with said flanges for preventing radial expansion of said discs, said means and said pins being removable without loosening the flanges or moving said shafts to permit removal and replacement of said flexible discs.

In testimony whereof, I have signed my name to this specification this 4th day of May, 1931.

PATRICK W. QUEEN.